(12) United States Patent
Tenghamn et al.

(10) Patent No.: US 12,742,898 B2
(45) Date of Patent: Sep. 22, 2026

(54) LINEAR MOTOR DRIVING MEANS FOR ACOUSTIC EMITTERS

(71) Applicant: Akitemos Solutions AB, Jönköping (SE)

(72) Inventors: Stig Rune Lennart Tenghamn, Hollywood, FL (US); Nils Gunnar Olof Kroling, Kavlinge (SE); Karl Henrik Ryttersson, Vasteras (SE)

(73) Assignee: Akitemos Solutions AB, Jönköping (SE)

( * ) Notice: Subject to any disclaimer, the term of this patent is extended or adjusted under 35 U.S.C. 154(b) by 103 days.

(21) Appl. No.: 18/729,841

(22) PCT Filed: Jan. 31, 2023

(86) PCT No.: PCT/US2023/011980

§ 371 (c)(1),
(2) Date: Jul. 17, 2024

(87) PCT Pub. No.: WO2023/150109

PCT Pub. Date: Aug. 10, 2023

(65) Prior Publication Data

US 2025/0102692 A1 Mar. 27, 2025

Related U.S. Application Data

(60) Provisional application No. 63/267,427, filed on Feb. 1, 2022.

(51) Int. Cl.
*G01V 1/145* (2006.01)
*G10K 9/12* (2006.01)
(Continued)

(52) U.S. Cl.
CPC ............. *G01V 1/145* (2013.01); *G10K 9/121* (2013.01); *H02K 7/14* (2013.01); *H02K 16/00* (2013.01);
(Continued)

(58) Field of Classification Search
CPC ........... G01V 1/145; G01V 2210/1293; G10K 9/121; G10K 2200/11; H02K 7/14;
(Continued)

(56) References Cited

U.S. PATENT DOCUMENTS 4,845,688 A * 7/1989 Butler .................... H02N 2/043 367/174
5,337,461 A * 8/1994 Falcus .................... G10K 9/121 29/25.35
(Continued)

FOREIGN PATENT DOCUMENTS

WO WO-2023150109 A1 * 8/2023 ........... H02K 41/031

OTHER PUBLICATIONS

Patent Cooperation Treaty, International Application No. PCT/US2023/011980, "International Search Report," May 23, 2023, 2 pages.

*Primary Examiner* — Daniel Pihulic
(74) *Attorney, Agent, or Firm* — Capitol City TechLaw

(57) ABSTRACT

An apparatus for generating acoustic waves in an aquatic environment through the use of linear motors mounted on a frame is disclosed herein. The linear motors can reciprocate at a first frequency which is transmitted through a transmission element and to a sound emitting surface. The structure of the apparatus can generate acoustic waves across a broad frequency to measure subterranean formations.

10 Claims, 19 Drawing Sheets

(51) Int. Cl.
*H02K 7/14* (2006.01)
*H02K 16/00* (2006.01)
*H02K 41/03* (2006.01)

(52) U.S. Cl.
CPC ... *H02K 41/031* (2013.01); *G01V 2210/1293* (2013.01); *G10K 2200/11* (2013.01); *H02K 2213/03* (2013.01)

(58) Field of Classification Search
CPC .. H02K 16/00; H02K 41/031; H02K 2213/03; H02K 41/02
See application file for complete search history.

(56) References Cited

U.S. PATENT DOCUMENTS

| | | | | |
|---|---|---|---|---|
| 5,926,439 A | 7/1999 | Piquette | | |
| 5,959,939 A * | 9/1999 | Tengham | B06B 1/045 | 367/174 |
| 6,076,629 A * | 6/2000 | Tengham | G01V 1/145 | 181/102 |
| 6,711,097 B1 * | 3/2004 | Engdahl | G10K 9/121 | 367/174 |
| 10,310,108 B2 * | 6/2019 | Ryttersson | G01V 1/04 | |
| 10,436,938 B2 * | 10/2019 | Bernhardsson | G01V 1/3861 | |
| 10,473,803 B2 * | 11/2019 | Tenghamn | G01V 1/005 | |
| 11,893,975 B1 * | 2/2024 | Butler | G10K 9/121 | |
| 2007/0206441 A1 | 9/2007 | Porzio | | |
| 2010/0308689 A1 * | 12/2010 | Rahman | F03G 7/06147 | 60/527 |
| 2014/0226439 A1 * | 8/2014 | Tenghamn | B06B 1/0276 | 367/15 |
| 2015/0185341 A1 * | 7/2015 | Ryttersson | G01V 1/04 | 367/15 |
| 2016/0202365 A1 * | 7/2016 | Engdahl | G01V 1/145 | 367/142 |
| 2016/0327662 A1 * | 11/2016 | Bernhardsson | G01V 1/143 | |
| 2017/0299739 A1 * | 10/2017 | Tenghamn | G01V 1/159 | |
| 2025/0102692 A1 * | 3/2025 | Tenghamn | H02K 41/02 | |

* cited by examiner

LINEAR MOTOR DRIVING MEANS FOR ACOUSTIC EMITTERS

TECHNICAL FIELD

This invention relates to a drive assembly for acoustic sources having sound emitting surfaces adapted to be placed into vibrational motion, in particular for use in seismic prospecting.

BACKGROUND OF THE TECHNOLOGY

Sources employed for generating sound waves in water can for example be sonar sources, flextensional sources, or seismic transmitters or sources. Upon reflection from the seabed and underlying geological formations, resulting echo signals can be detected by means of hydrophones or geophones of various types.

It is well known that low frequency sound waves can be transmitted over longer distances through water and geological structures than high frequency sound waves can. There has been a need both for military applications as well as for the marine sector of oil and gas industry for powerful low frequency sound sources which can operate under water. Sources of various constructions and designs for these purposes and fields of use, have been previously available.

Most of the acoustic sources employed today are of the impulsive type, in which efforts are made to have the sources emit as much energy as possible during as short a time as possible. The frequency contents of such a source can be modified only to a small degree, and different sources are selected for different surveying problems.

Recently, seismic energy sources have been developed in the form of vibrators which can vibrate within various frequency bands resulting in a so-called “frequency sweep.” These vibrators operate by hydraulic means with sources employing piezoelectric and magnetostrictive materials or linear type motor drives. In hydraulic vibrators a piston is controlled by a valve arrangement allowing the piston to obtain high oscillation amplitudes. The piezoelectrical effect involves a change of length of a crystalline material when an electrical voltage is applied to its outer surfaces, and that an electrical voltage is generated when the material is subjected to a physical deformation. Magnetostriction means that a magnetic material being subjected to a magnetic field change will undergo a length change, and conversely that an applied length change of the material will give rise to a change of the magnetic field. The linear motor drive is used to apply a magnetic field to a rod consisting of permanent magnets.

There are various manners of designing acoustic sources. For low frequency uses, it is common to let the sources have a circular surface (in the form of a piston). When a hydraulic or linear motor principle is employed, a cylindrical shape with either a circular or elliptic cross-section when piezoelectric and magnetostrictive materials is used.

The greatest problem with these types of controllable source is to obtain a well-defined and sufficiently high amplitude of the oscillations. In order to obtain this, there will be a need for either a large source surface or a small source surface having high oscillation amplitudes.

Vibrators based on the hydraulic principle (for example within marine seismic exploration) provide high amplitudes at low frequencies. The degree of control of these hydraulic piston sources as regards amplitude combined with frequency, is limited, however.

Vibrators based on the linear motor principle (for example within marine seismic exploration) also provide high amplitudes at low frequencies. The piston motions are controlled by the magnetic field. The degree of control of these piston sources as regards amplitude combined with frequency, is rather good but normally with low efficiency in a broadband sense, since they only depend on one resonance at a selected frequency.

There are sources that have a variable spring constant that will follow the output frequency. In that case it is possible to create a high efficiency in the whole frequency band. This is a good concept but can limit the source to generate sweeps instead of arbitrary signals, which can be of interest to create more advanced signal schemes.

Another type of acoustic source operates in the same way as electrodynamic loudspeakers with an electrically conducting coil making a controllable magnetic field and a permanent magnet. When the coil is supplied with a varying electric current the two parts will move in relation to each other. These in their turn put a piston in motion which transfers the vibrations to the surrounding water. The piston has approximately the same diameter as the coil. Examples of such sources are found in the US Navy series J-9, J-11 and J-15, manufactured by Marine Resources in Florida, USA.

These sources are found in many different sizes. They have a relatively flat frequency response, but low efficiency. Larger sources may have a higher efficiency, but smaller bandwidth.

There are some flextensional sources based on electromagnetic coil drives. These are complicated and even if they generate a broadband signal with high efficiency, the complexity makes the design complicated and the durability can be questionable. Therefore, there is a need in the art to provide a simple, flexible, and reliable drive assembly capable of emitting signals within a wide range of frequencies.

SUMMARY OF THE INVENTION

A first embodiment of the present technology provides for a drive assembly for acoustic sources. The drive assembly can include a vibrating surface that can be set in vibrational motion, a frame with linear motors, and flexible transmission elements. The flexible transmission elements can connect between fastening devices extending on both sides of the axis. The linear motors can be connected to the transmission elements and provide a controlled oscillating motion. The fastening devices can further be connected to a sound emitting surface.

In some embodiments, the linear motors can be centrally positioned on the frame. The linear motors can oscillate at a first frequency and the flexible transmission elements can oscillate at a second frequency. These frequencies can be between 1 and 300 Hz.

The transmission elements can be made of carbon fiber, glass fiber, or spring steel. The assembly can also have a spring element. The spring element can be made of carbon fiber, glass fiber, or spring steel.

A second embodiment of the present technology provides for a method of generating acoustic waves. The method comprises reciprocating a linear motor at a first frequency. This can vibrate a transmission element. The vibrating transmission element can vary the shape of a sound emitting surface by being connected to the vibrating transmission element by a fastening device. This can result in the emission of acoustic waves from the sound emitting surface.

The linear motor can reciprocate with a relatively large range of motion relative to the rest of the device. The transmission element can vibrate with a relatively small range of motion relative to the rest of the device. The transmission element can vibrate at a second frequency, which can combine with the first frequency to result in a third vibrational frequency. A spring element can further modify that third frequency to a fourth frequency.

A third embodiment of the present technology provides for a drive assembly for acoustic sources. The assembly can include vibrating surfaces, a frame with at least one centrally positioned linear motor, two or more flexible transmission elements, two or more spring elements, and two fastening devices. The flexible transmission elements can connect between two fastening devices on each end. The linear motors can be designed to provide a controlled oscillating motion.

The transmission elements and spring elements can be made of carbon fiber. The transmission and spring elements along with the vibrating surface can define at least three resonances. The resonances can be within the frequency range of 1 to 300 Hz. The transmission elements can be flexible plates or rods. These can be rotatably fastened to the frame by a fastening device.

DESCRIPTION OF THE DRAWINGS

The invention will be described in detail below, referring to the disclosed drawings.

DETAILED DESCRIPTION

Figure 1:
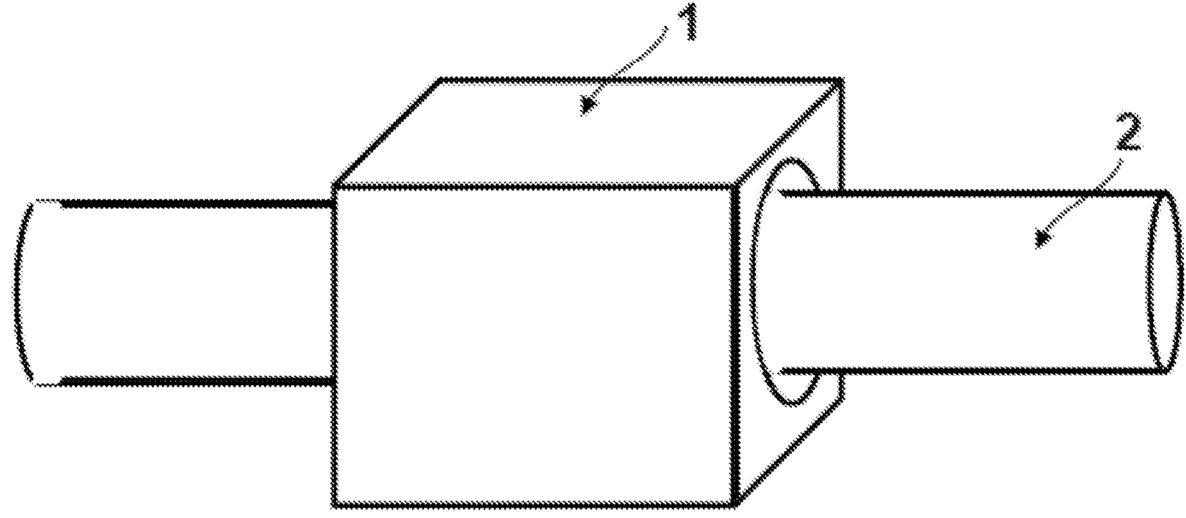
FIG. 1 shows the principal of a linear motor with a forcer and a plunger as provided by embodiments of the invention.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment," "an embodiment," "certain embodiments," or "other embodiments" of the present invention are not intended to be interpreted as excluding the existence of additional embodiments that also incorporate the recited features. Furthermore, reference to terms such as "above," "below," "upper," "lower," "side," "front," "back," or other terms regarding orientation are made with reference to the illustrated embodiments and are not intended to be limiting or exclude other orientations.

To understand the importance of resonances for an acoustic source which have a size that is smaller than the wavelength generated, the impedance for a source is provided as:

$$Z_r = R_r + jX_r$$

where $Z_r$ is total impedance, $R_r$ is radiation impedance, and $jX_r$ is reactive impedance.

In an analysis of the energy transfer of a marine vibrator, the system may be approximated as a baffled piston. In the expression of the total impedance that will be experienced, the radiation impedance $R_r$ of a baffled piston is:

$$R_r = \pi a^2 \rho_0 c R_1(x)$$

and the reactive impedance is:

$$X_r = \pi a^2 \rho_0 c X_1(x);$$

$$x = 2ka = \frac{4\pi a}{\lambda} = \frac{2\omega a}{c};$$

$$R_1(x) = 1 - \frac{2}{x} J_1(x);$$

and $$X_1(x) = \frac{4}{\pi} \int_0^{\frac{\pi}{2}} \sin(x \cos\alpha) \sin^2\alpha \, d\alpha$$

Where $\rho_0$=density of water, $\omega$=radial frequency, k=wave number, a=radius of piston, C=sound velocity, $\lambda$=wavelength, and $J_1$=Bessel function of the first order.

Using the Taylor series expansion on the above equations yields $$R_1(x) = \frac{x^2}{2^2 1!\,2!} - \frac{x^4}{2^4 2!\,3!} + \cdots$$

$$X_1(x) = \frac{4}{\pi}\left[\frac{x}{3} - \frac{x^3}{3^2 5} + \frac{x^5}{3^2 5^2 7} - \cdots\right]$$

For low frequencies, when x=2ka is much smaller than 1, the real and imaginary part of the total impedance expression may be approximated with the first term of the Taylor expansion. The expressions for low frequencies, when the wavelength is much larger than the radius of the piston, becomes:

$$R_1(x) \to \frac{1}{2}(ka)^2$$

$$X_1(x) \to \frac{8ka}{3\pi}$$

It follows that for low frequencies R will be a small number compared to X, which suggests a very low efficiency signal generation. However, by introducing a resonance in the lower end of the frequency spectrum, low frequency acoustic energy may be generated more efficiently. At resonance the imaginary (reactive) part of the impedance is cancelled, and the acoustic source can efficiently transmit acoustic energy into the water. To improve the efficiency further, more than one resonance would improve the acoustic output more.

The present technology, in a preferred embodiment, comprises a marine vibrator that displays at least two resonant frequencies within the seismic frequency range of interest, typically a range between 1 Hz and 300 Hz The object of this technology is to provide a simple, flexible, and reliable drive assembly capable of emitting signals within a wide range of frequencies. The drive assembly may be used in several different situations in addition to seismic explorations, such as uses related to submarine sound sources and sonars. The shape of the sound emitting surfaces may vary according to use, and all of the different embodiments mentioned below may be utilized. The aim of the present invention can be to provide a sound apparatus for use in seismic studies capable of emitting signals in a wide range of frequencies. According to the technology, such apparatus comprises a frame with a first driver part for vibrating a sound emitting surface attached to at least two fastening devices positioned on opposite sides of the frame and connected by two or several flexible transmission elements extending on both sides of the axis between the fastening devices or in parallel to the fastening devices. At least two linear motors are connected to the transmission elements for generating thereby controlled relative oscillating motion.

In FIG. 1 the principal of a linear motor is shown. Linear motors can have a simple design with a minimum of moving parts. Linear motors with high speeds can further be self-contained. The efficiency of linear motors can be about 85%. The forcer 1 can contain electrical coils and other electronics. The plunger 2 can have permanent magnets and can usually be a sleeve made of steel. Linear motors can have an advantage in outdoor or dirty environments in that the plunger 2 and forcer 1 may not need to contact each other.

As a result, the electromagnetic drive coils can be waterproofed and sealed against moisture and corrosion, allowing for a very long service life. Linear motors can be used extensively in high performance positioning systems for applications which require various combinations of high velocity, high precision, and high force.

Figure 2A:
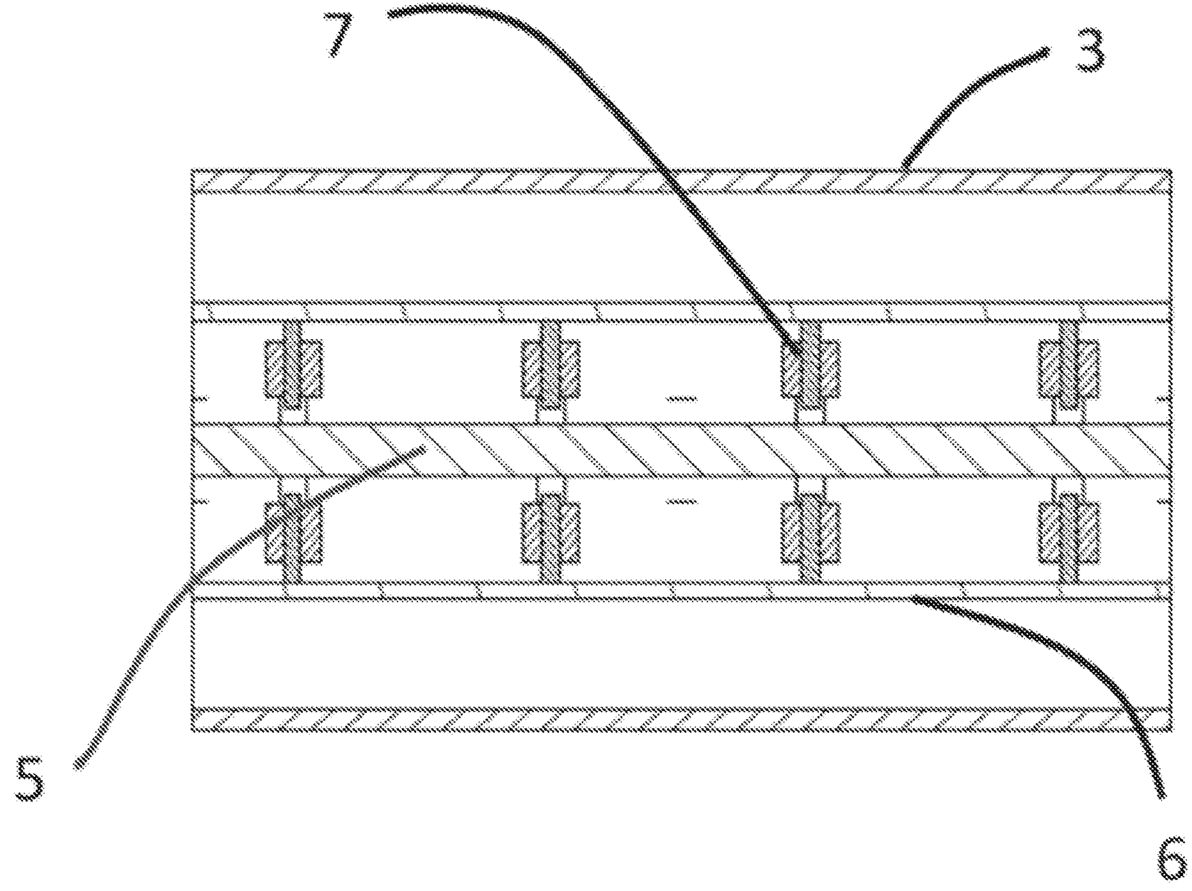
FIGS. 2A and 2B show one embodiment of the flextensional source with linear motors connected to a transmission element.
Figure 2B:
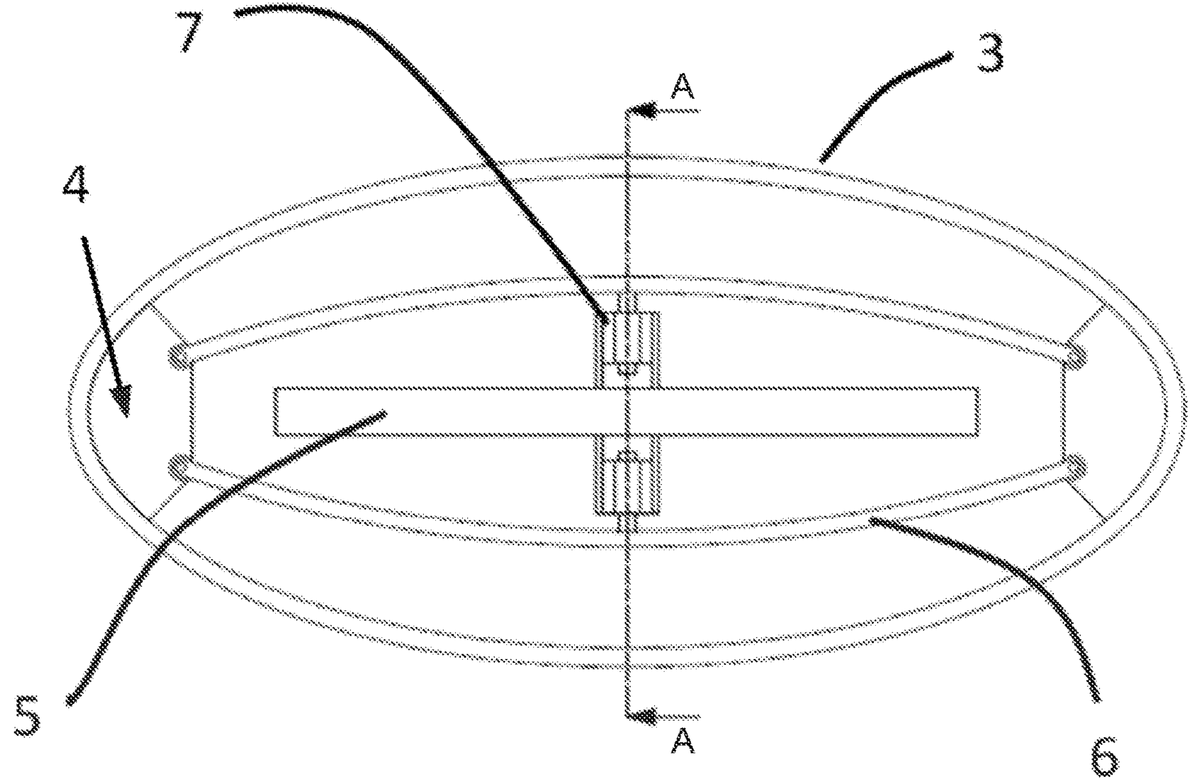

In FIGS. 2A and 2B an embodiment of the technology is shown in which transmission elements 6 can have a slightly arched shape and the linear motors 7 can be centrally mounted on the frame 5 and the transmission elements 6 respectively. FIG. 2A shows a cross-sectional view of the embodiment along plane A-A of FIG. 2B. The transmission elements 6 may be shaped as flexible plates or rods and can be preferably rotatably fastened to the fastening devices 4. The distance from the central part of the transmission elements 6 to the axis between the fastening devices 4 may be substantially less than the distance from the central part to the fastening devices 4. This way a transmission can be provided in which a large movement of the drive part 7 on the transmission element 6 with a relatively small force, can lead to a small movement of the fastening devices 4 but with a correspondingly larger force.

The transmission can depend on the curvature of the transmission elements 6. If the transmission elements are essentially straight a force doubling can be obtained compared to the movements of the drive. The fastening devices 4 are shown in FIG. 2B as beams, but the fastening of the transmission elements 6 to the sound emitting surfaces may also be done directly to the sound emitting surfaces 3. The sound emitting surfaces 3 in FIGS. 2A and 2B can be elliptic. When the fastening devices 4 are pulled inwards by the transmission elements 6, the ellipse can widen, creating a pressure wave in the environment. In this way, the movements of the linear motor drives can propagate outwards and result in acoustic waves in the water.

By varying the eccentricity of the ellipse and the transmission rate in the drive assembly it may be adapted to different situations and frequency contents. As an example, the fastening devices may be fastened directly to pistons, in which a relatively large movement of the drives will provide a small movement of the pistons.

The sound emitting surface 3 can have a resonance which depends on the equivalent water mass acting on the surface, which is the amount of water oscillating with the vibrating sound emitting surfaces and the stiffness of the sound emitting surfaces $K_{Shell}$.

For a piston with a radius $\alpha_x$ the equivalent water mass is:

$$M_x = \rho\frac{8a_x^3}{3}$$

Where ρ is the density. When using an elliptical shell and not a baffled piston, the surface area can be approximated by calculating the length and the width of the elliptical and using reduction factor of 0.5.

$$S_x = \text{length} * \text{width} * 0.5$$

The equivalent radius $\alpha_x$ is then arrived from:

$$a_x = \sqrt{S_x/\pi}$$

The primary resonance frequency will then be:

$$f = \frac{1}{2\pi}\sqrt{\frac{K_{Shell}}{M_x}}$$

Figures 3A, 3B, 3C:
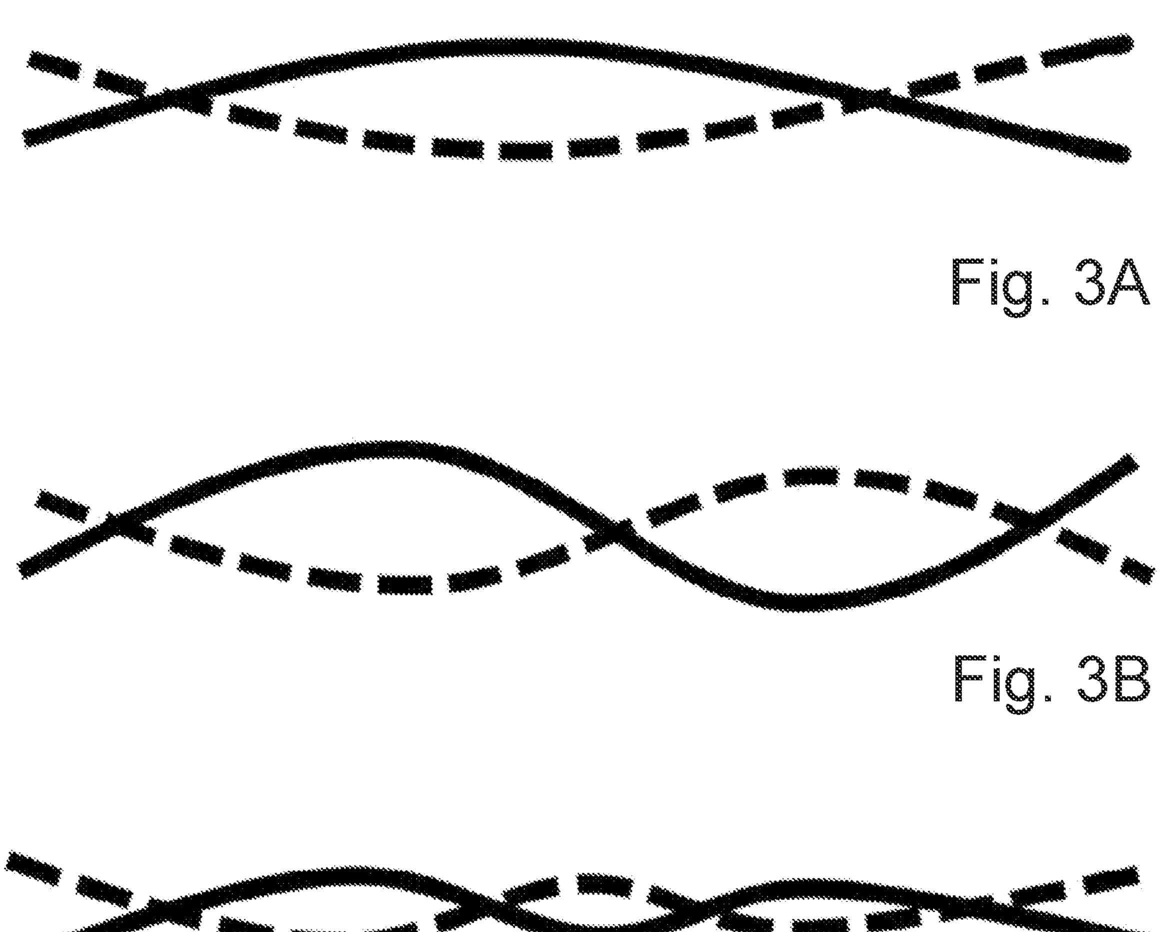
FIGS. 3A-3C show resonance modes of the transmission element connected to the linear motor.
Figure 4A:
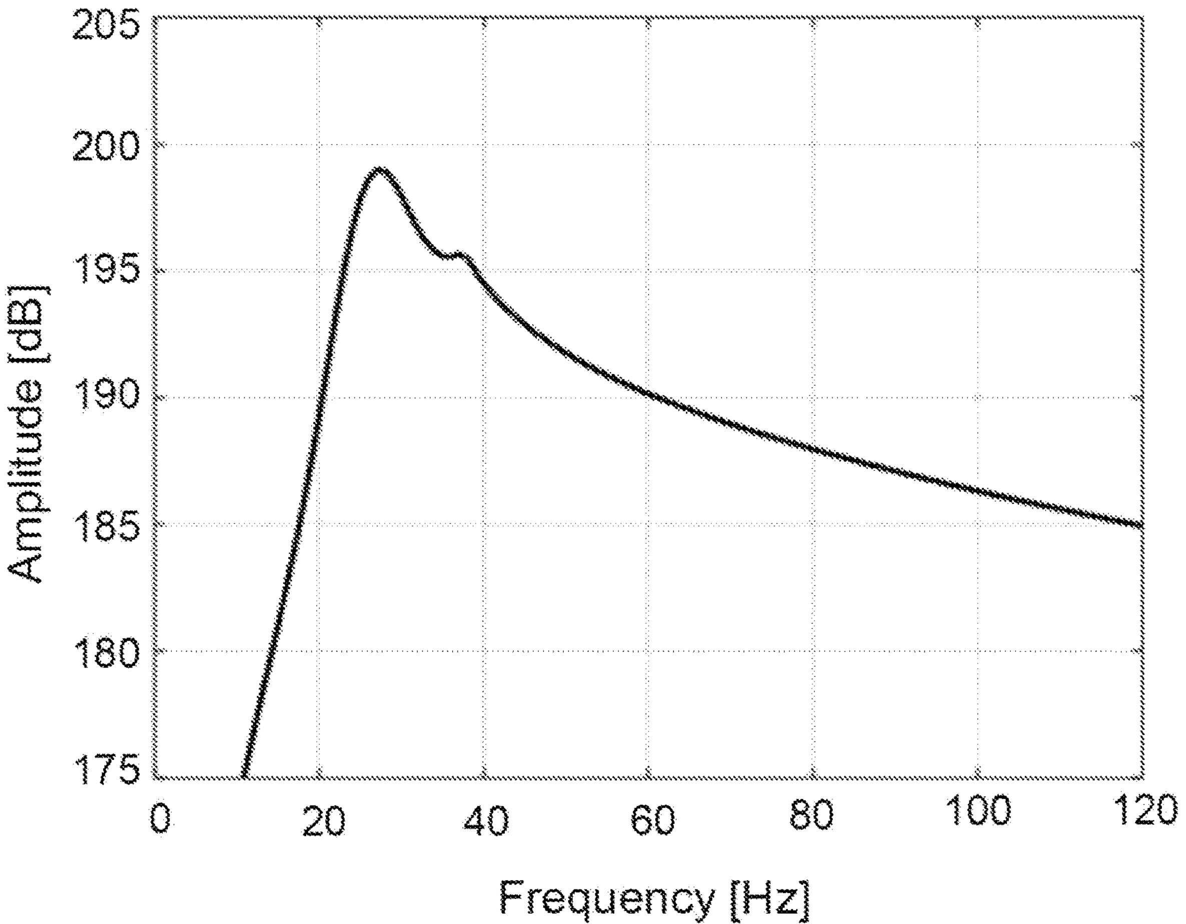
FIGS. 4A-4C show different resonance modes for the flextensional source.

Having a source with only one resonance would result in a frequency response that is similar to the FIG. 4A. In FIGS. 3A-3C, different resonance modes are shown for the transmission element 6. The first resonance mode shown in FIG. 3A can be approximated with:

$$f_1 = 1.028\frac{a}{L^2}\sqrt{\frac{Y}{d}}$$

Where α=thickness, L=length, Y=Young's modulus and d=density.

$$f_n = 0.441\left[n + \frac{1}{2}\right]^2 f_1$$

The third resonance mode shown in FIG. 3C can be approximated with $f=5.40f_1$. The second resonance mode (FIG. 3B) may not exist in a forced vibration mode where the linear motor acts on the transmission element 6.

With the linear motor 7 attached to the transmission element 6, a spring mass system can result. The plunger 2 can add mass, and the spring constant together with the mass will determine the resonance frequency:

$$f_1 = \frac{1}{2\pi}\sqrt{\frac{K_1}{M_{plunger}}}$$

$$K_1 = (2\pi)^2 f_1^2 M_{plunger}$$

It is obvious that for the third resonance mode (FIG. 3C) the transmission element 6 can have a much larger spring constant $$K_3 = (2\pi)^2(5.40 f_1)^2 M_{plunger}$$

The stiffness for the third resonance mode can make the transmission element 6 nearly 30 times stiffer than for the first resonance mode. This can be used to improve the broadband performance of the source. For example, a source can operate from 25-90 Hz in the first resonance mode (FIG. 3A) as determined by the elliptical sound emitting surface 3 and the mass load from the surrounding water.

Figure 4B:
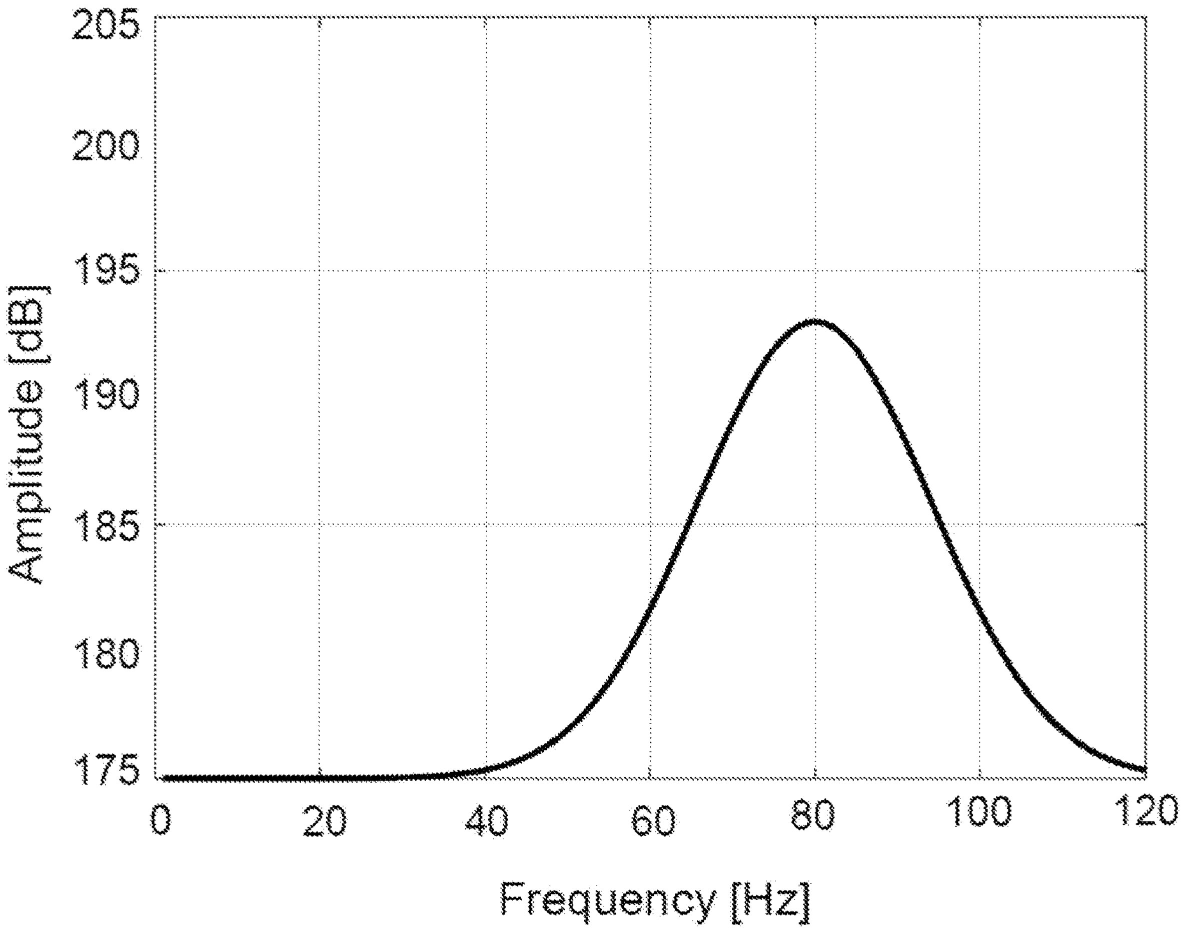
Figure 4C:
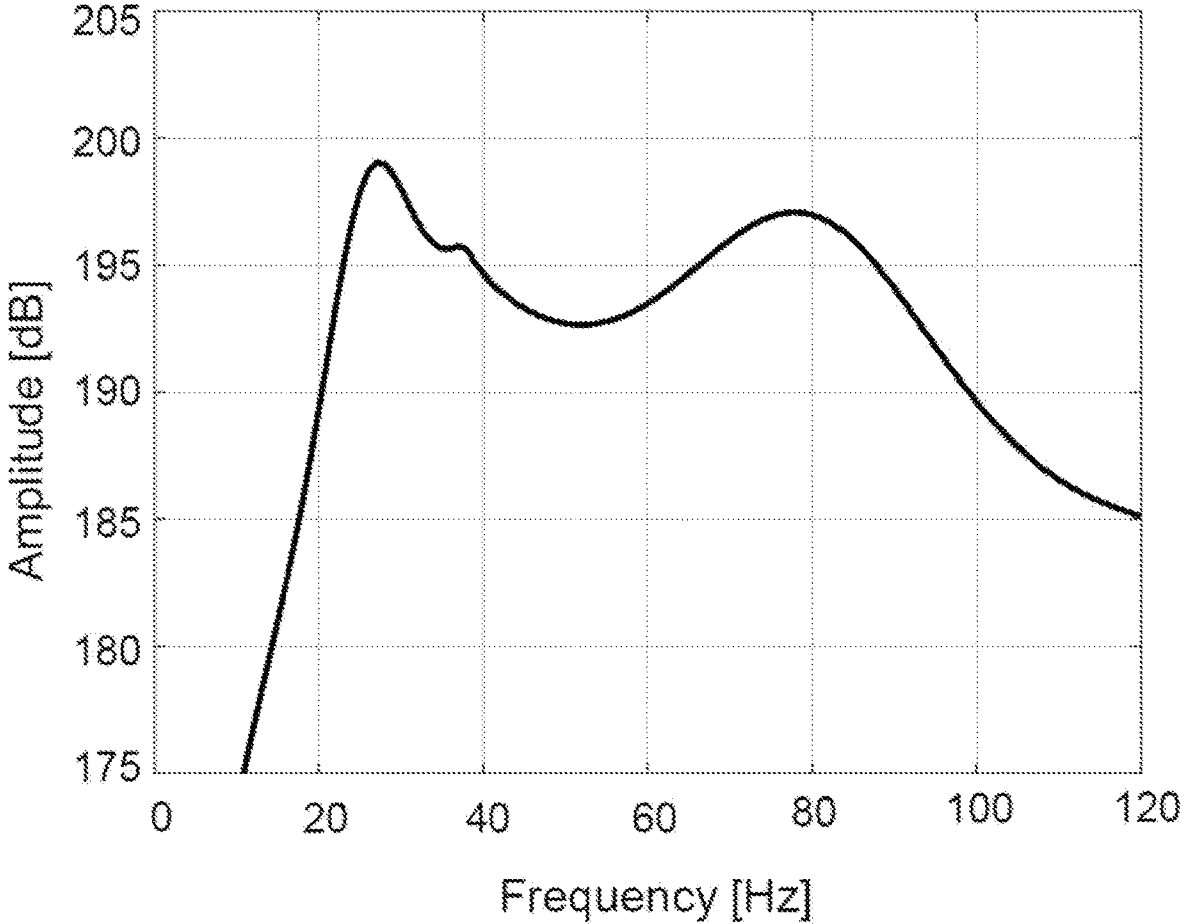

FIG. 4A-4C show the result of the first resonance from equivalent water mass and the sound emitting surface 3. In a first embodiment, the resonance can be around 25 Hz (FIG. 4A). The resonance of the transmission element can be set to 80 Hz (FIG. 4B). Together will the two resonances in FIG. 4A and FIG. 4B give the combined result shown in FIG. 4C. The two resonances in FIG. 4A and FIG. 4B can be set rather independent from each other. This result shows a source that can have a much better broadband performance and efficiency over large band of frequencies. The first resonance of the transmission element 6 can approximately be 80/5.4 which is about 15 Hz. This 15 Hz resonance may not affect the output of the source.

Figure 5:
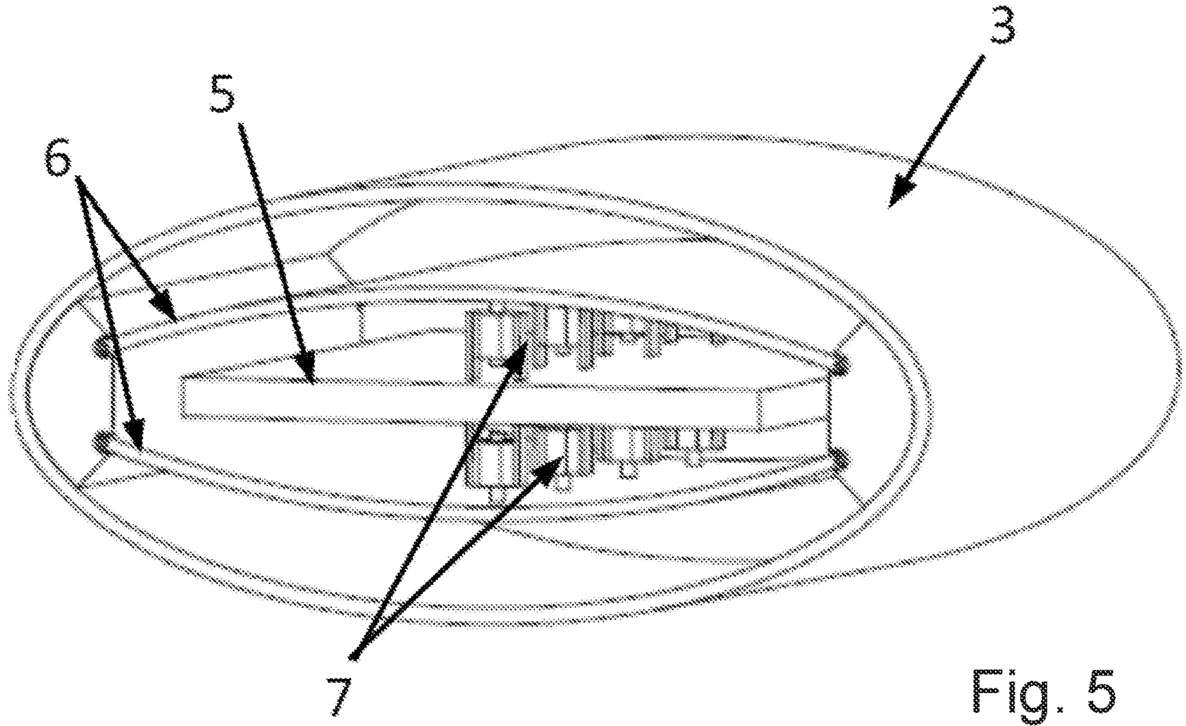
FIG. 5 shows a 3D view of the embodiment of the flextensional source of FIG. 2B.

In FIG. 5 is a 3D view of the source shown in FIG. 2. The linear motors 7 can be positioned along a centerline of the assembly.

Figure 6A:
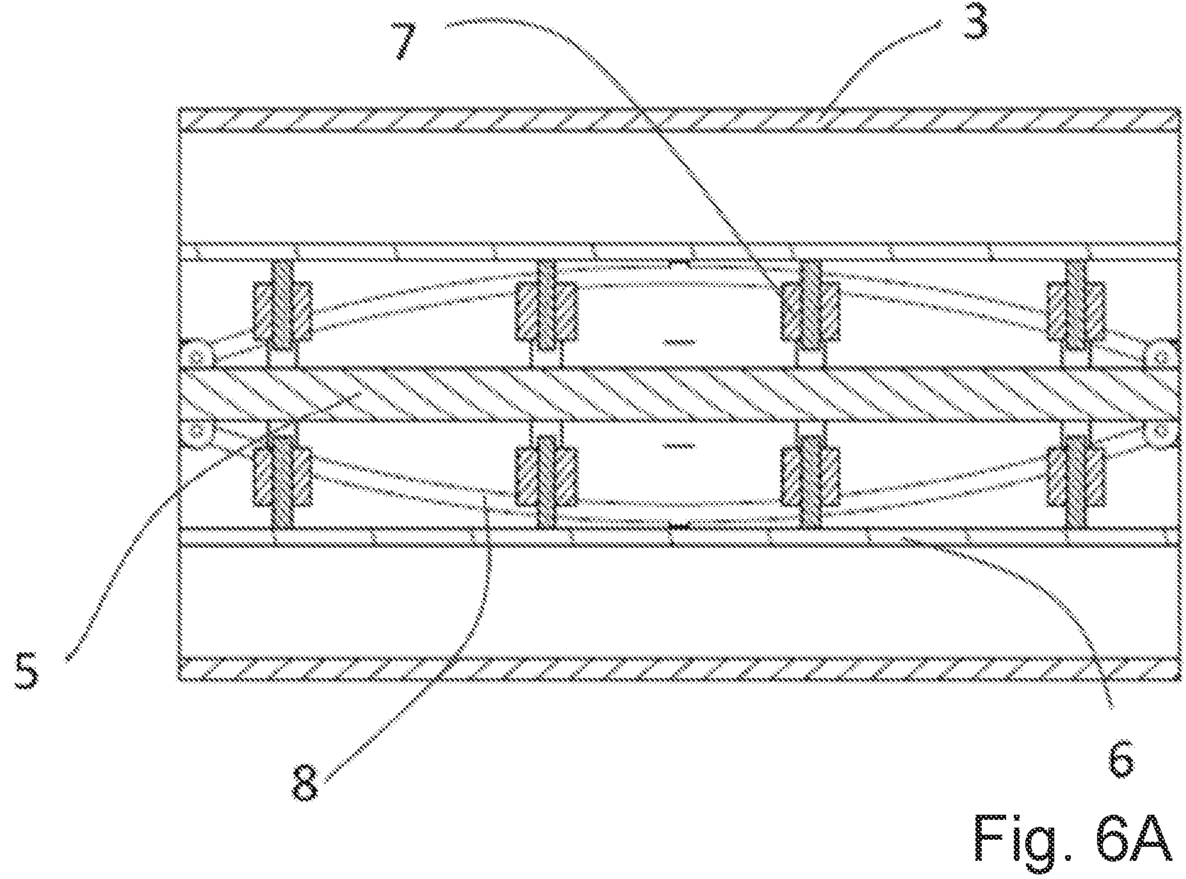
FIGS. 6A and 6B show one embodiment of the flextensional source with linear motors connected to a transmission element and a spring elements connected to the transmission element.
Figure 6B:
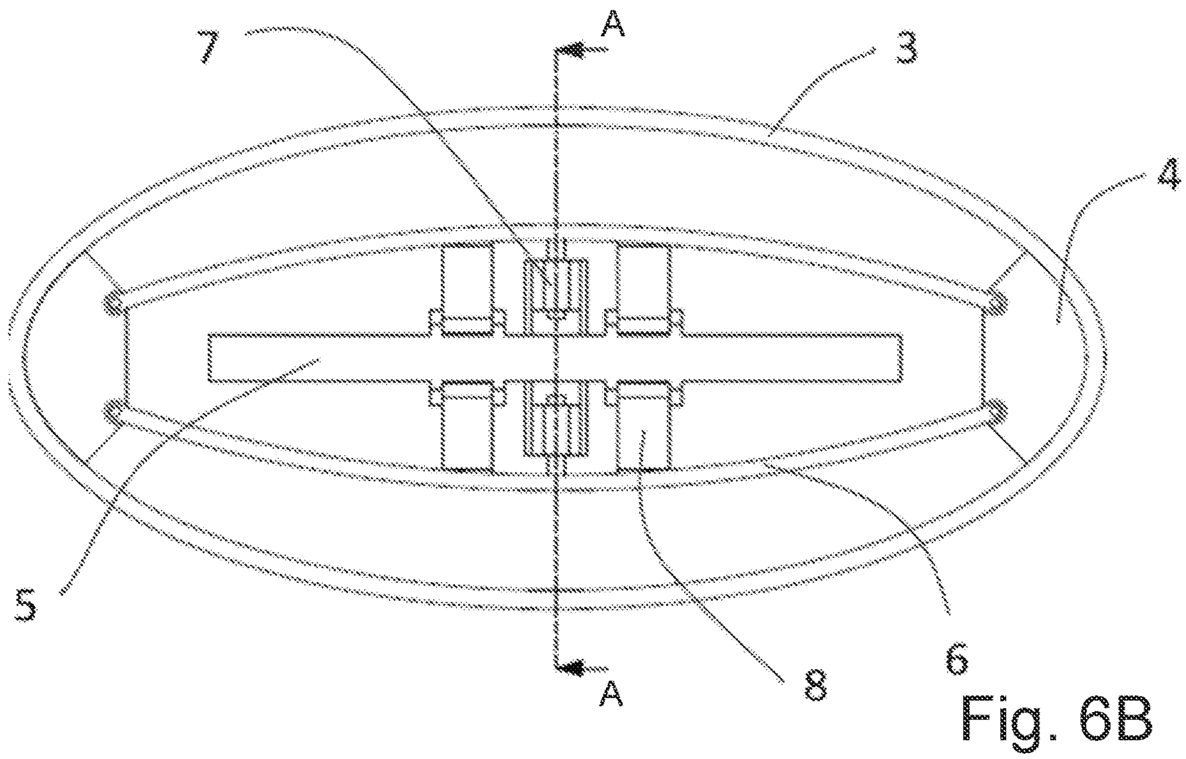

In FIGS. 6A and 6B an embodiment of the invention is shown in which the transmission elements 6 can have a slightly arched shape and the linear motors 7 can be centrally mounted on the frame 5 and the transmission elements 6 respectively. FIG. 6A shows a cross-sectional view of the embodiment along plane A-A of FIG. 6B. The transmission elements 6 may be shaped as flexible plates or rods and are preferably rotatably fastened to the fastening devices 4. The distance from the central part of the transmission elements 6 to the axis between the fastening devices 4 can be substantially less than the distance from the central part to the fastening devices 4. In this way, an apparatus is provided in which a large movement of the drive part 8 on the transmission element 6, but with a relatively small force, leads to a small movement of the fastening devices 4, but with a correspondingly larger force. The transmission can depend on the curvature of the transmission elements 6. If the transmission elements are essentially straight a force doubling can be obtained compared to the movements of the drive. The fastening devices 4 are shown in FIG. 6B as beams, but the fastening of the transmission elements 6 to the sound emitting surfaces may also be done directly to the sound emitting surfaces. The sound emitting surfaces 3 in FIG. 6B are elliptic.

When the fastening devices 4 are pulled inwards by the transmission elements 6 the ellipse will widen, which can create a pressure wave in the environment. In this way, the movements of the linear motor drives 7 will propagate outwards and result in acoustic waves in the water. By varying the eccentricity of the ellipse and the transmission rate in the drive assembly it may be adapted to different situations and frequency contents. In other embodiments, different sound emitting surfaces may be chosen. As an example, the fastening devices 4 may be fastened directly to pistons, in which a relatively large movement of the drives will provide a small movement of the pistons.

Spring elements 8 can be attached to the transmission element 6. This spring element 8 can be a be of any kind, but preferably a spring that will have a frequency dependence. The preferred material in the spring elements 6 and 8 can be carbon fiber, glass fiber, or spring steel. With the same understanding as in FIGS. 4A-4C the spring element 8 can have different resonance modes. The third resonance mode can be between the 25 Hz and the 80 Hz resonance modes, for example 50 Hz.

For the third resonance mode (FIG. 3C) we have:

$$K_3 = (2\pi)^2(5.40 f_1)^2$$

Comparing 50 Hz with 90 Hs would result such that the spring constant for the 50 Hz resonance is 13 times lower than for the 90 Hz.

The resonance for the first resonance can be described as:

$$f_1 = \frac{1}{2\pi}\sqrt{\frac{K_1 + \frac{K_1}{13}}{M_{plunger}}}$$

The first resonance will only change about 4% with the added spring element (8). This makes it possible to add another resonance without affecting other resonances very much. The resonance can be selected rather freely in the frequency band 1-300 Hz. This added spring will increase the broadband performance of the source and improve the efficiency.

Figure 7:
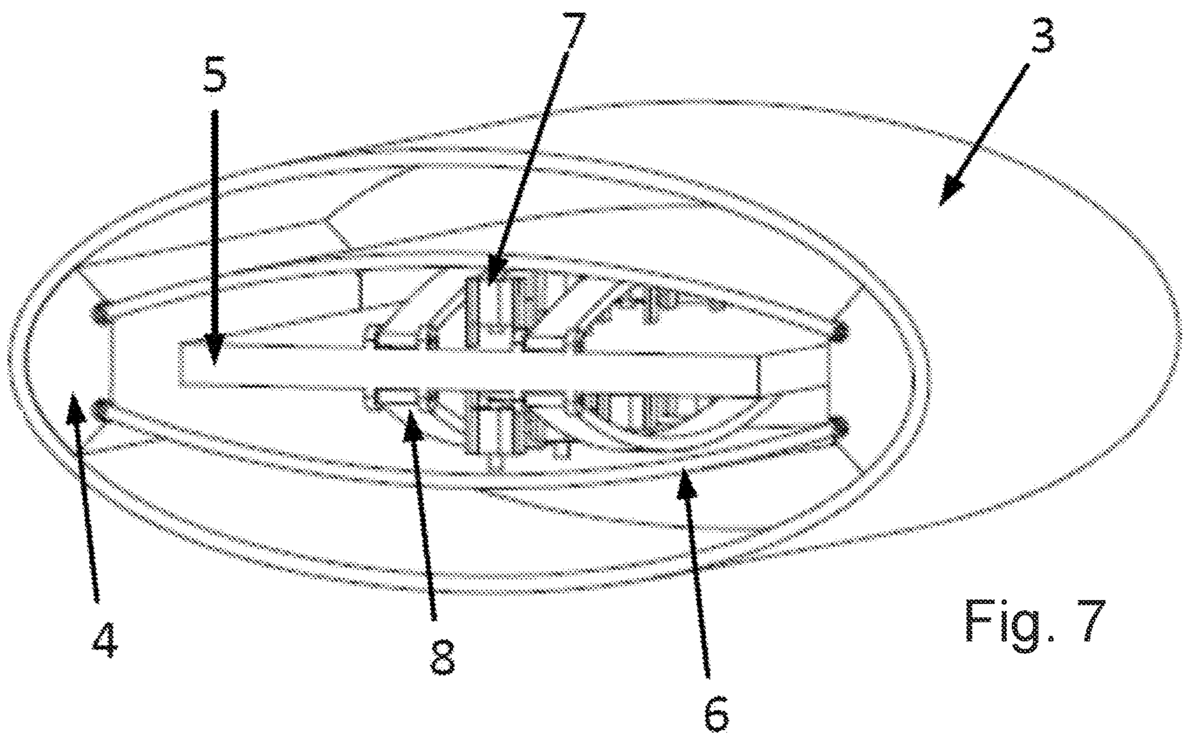
FIG. 7 shows a 3D view of the embodiment of the flextensional source of FIG. 6B.

In FIG. 7 is a 3D view of the source shown in FIG. 6B.

Figure 8A:
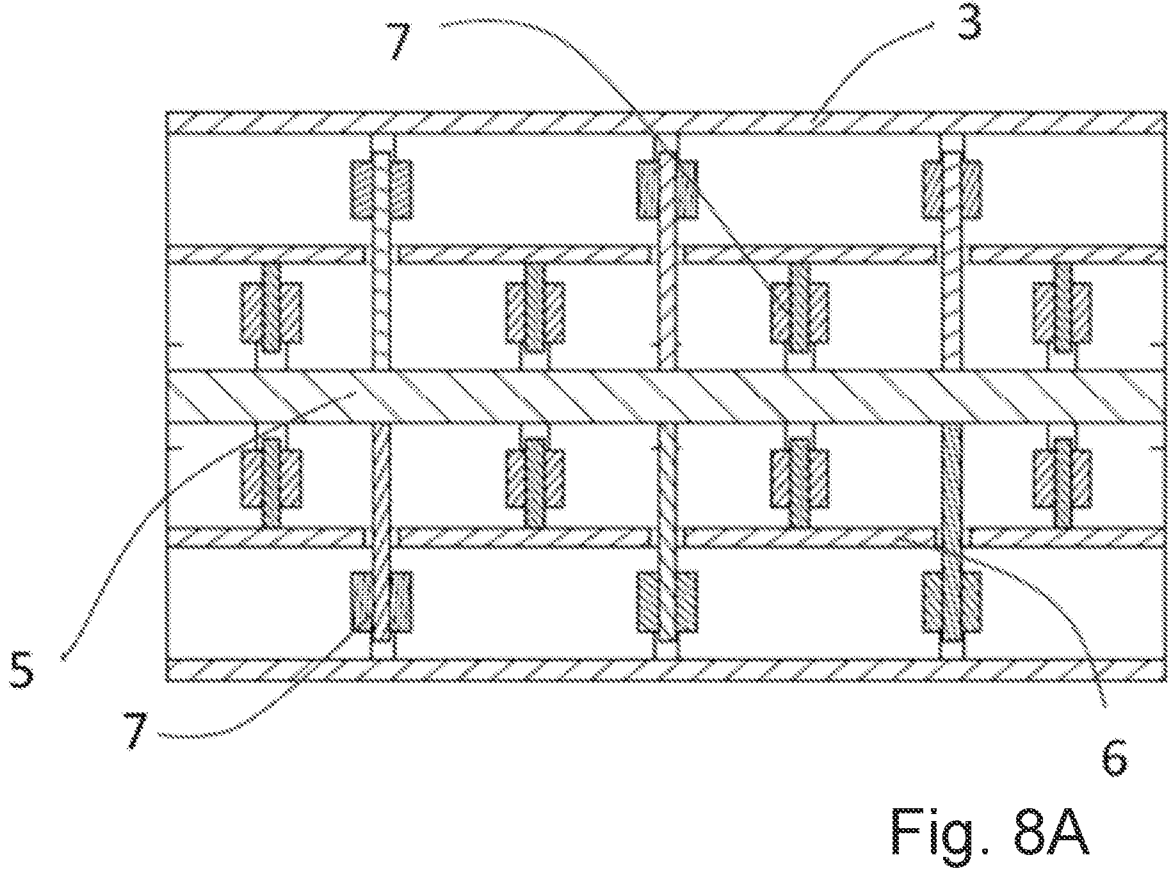
FIG. 8A and 8B show one embodiment of the flextensional source with linear motors connected to a transmission element and to the sound emitting surface.
Figure 8B:
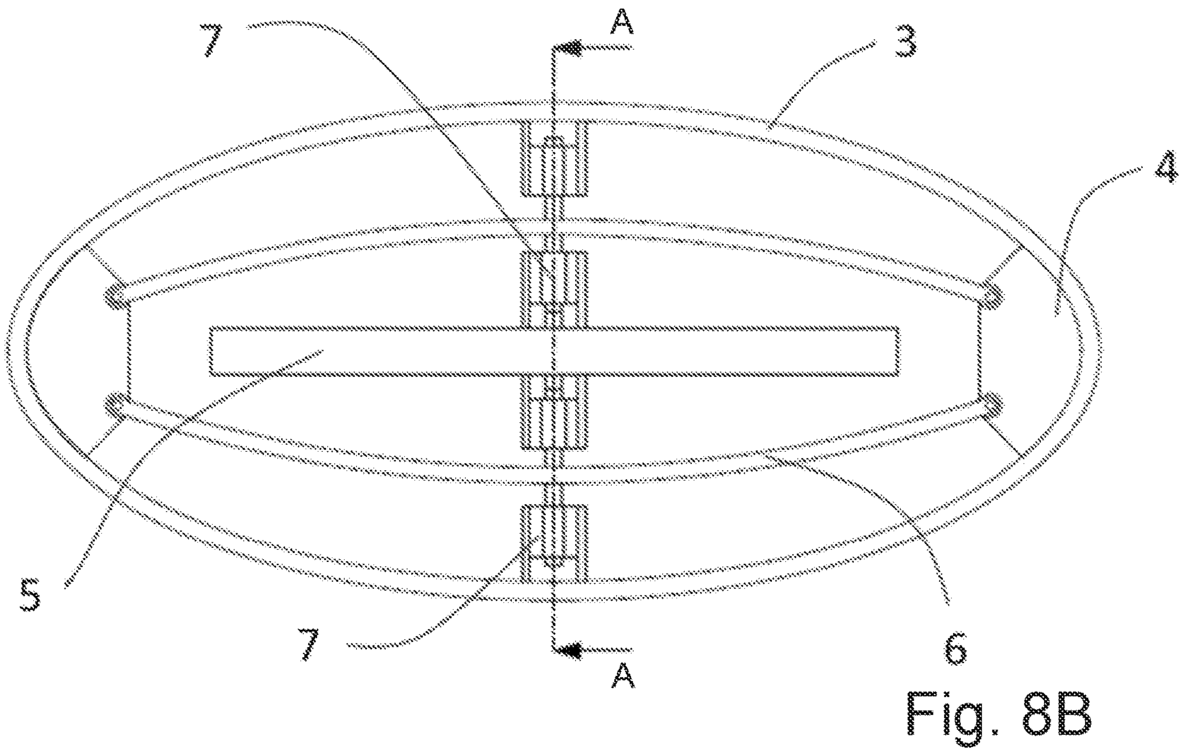

In FIGS. 8A and 8B an embodiment of the technology is shown in which the transmission elements 6 have a slightly arched shape and the linear motors 7 are centrally mounted on the frame 5 and the transmission elements 6 respectively. FIG. 8A shows a cross-sectional view of the embodiment along plane A-A of FIG. 8B. Linear motors 7 can also be centrally mounted on the frame 5 and the sound emitting surfaces 3. The transmission elements 6 may be shaped as flexible plates or rods and are preferably rotatably fastened to the fastening devices 4. The distance from the central part of the transmission elements 6 to the axis between the fastening devices 4 is substantially less than the distance from the central part to the fastening devices 4. This way a transmission is provided in which a large movement of the drive part 8 on the transmission element 6, but with a relatively small force, leads to a small movement of the fastening devices 4, but with a correspondingly larger force.

The transmission will depend on the curvature of the transmission elements 6. If the transmission elements are essentially straight, a force doubling can be obtained compared to the movements of the drive. The fastening devices 4 are shown in FIG. 8B as beams, but the fastening of the transmission elements 6 to the sound emitting surfaces may also be done directly to the sound emitting surfaces. The sound emitting surfaces 3 in FIG. 8B are elliptic. When the fastening devices 4 are pulled inwards by the transmission elements the ellipse can widen, creating a pressure wave in the environment. This way the movements of the linear motor drives can propagate outwards and result in acoustic waves in the water. By varying the eccentricity of the ellipse and the transmission rate in the drive assembly it may be adapted to different situations and frequency contents.

In other embodiments, different sound emitting surface solutions may be chosen. As an example, the fastening devices may be fastened directly to pistons, in which a relatively large movement of the drives can provide a small movement of the pistons. Having linear motors 7 on both the spring elements 6 and the sound emitting surfaces 3 can improve the acoustic output. The linear motors 7 attached to the sound emitting surfaces can be used for the first resonance determined by the sound emitting surfaces 3 interaction with the equivalent water mass. The linear motors 7 acting on the spring elements 6 can be used for the second resonance. All linear motors 7 can be used between the resonances.

Figure 9:
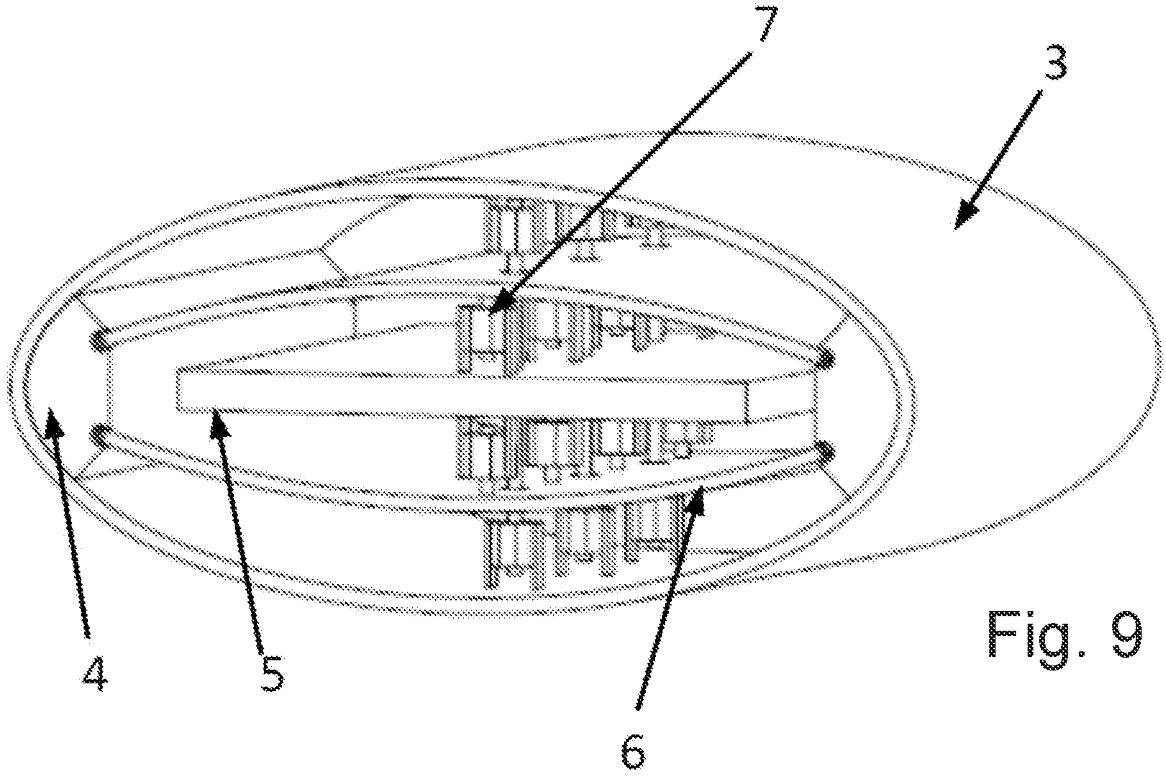
FIG. 9 shows a 3D view of one embodiment of the flextensional source of FIG. 8B.

In FIG. 9 is a 3D view of the source shown in FIG. 8B.

Figure 10A:
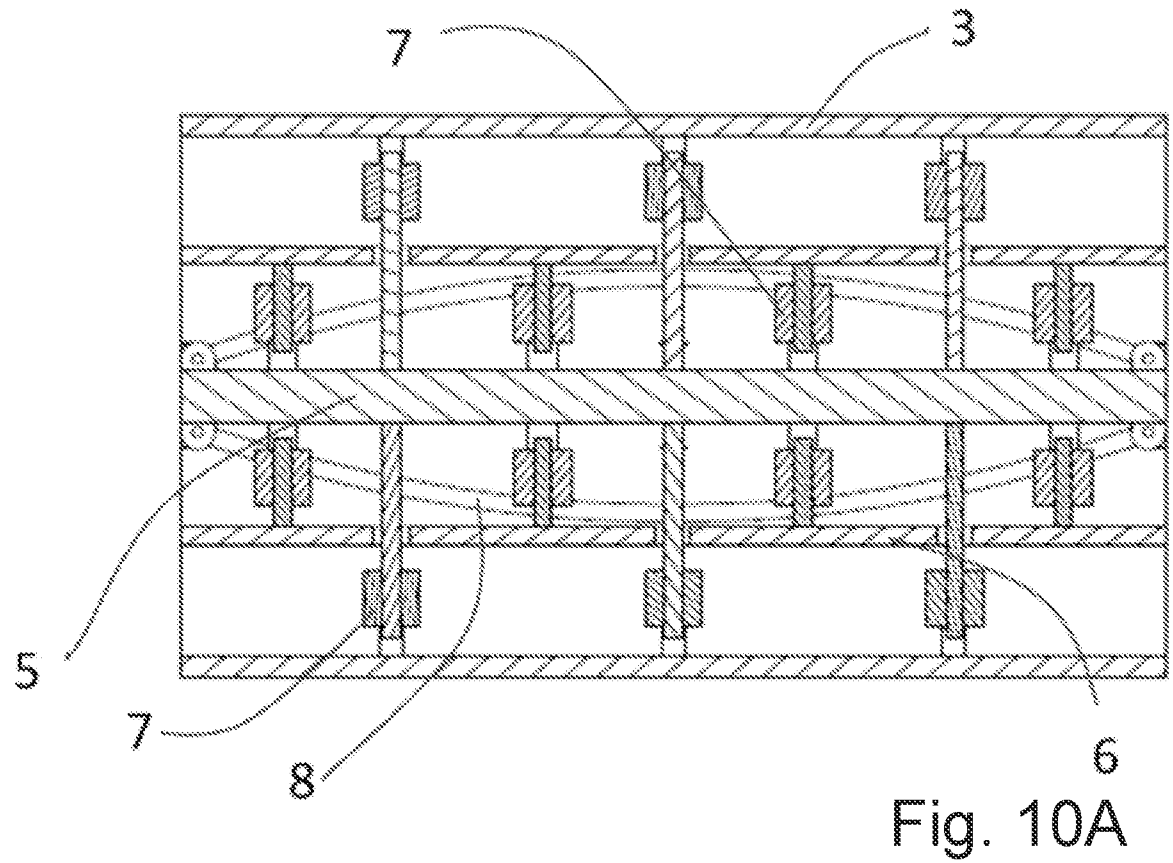
FIGS. 10A and 10B show one embodiment of the flextensional source with linear motors connected to a transmission element and to the sound emitting surface and a spring elements connected to the transmission element.
Figure 10B:
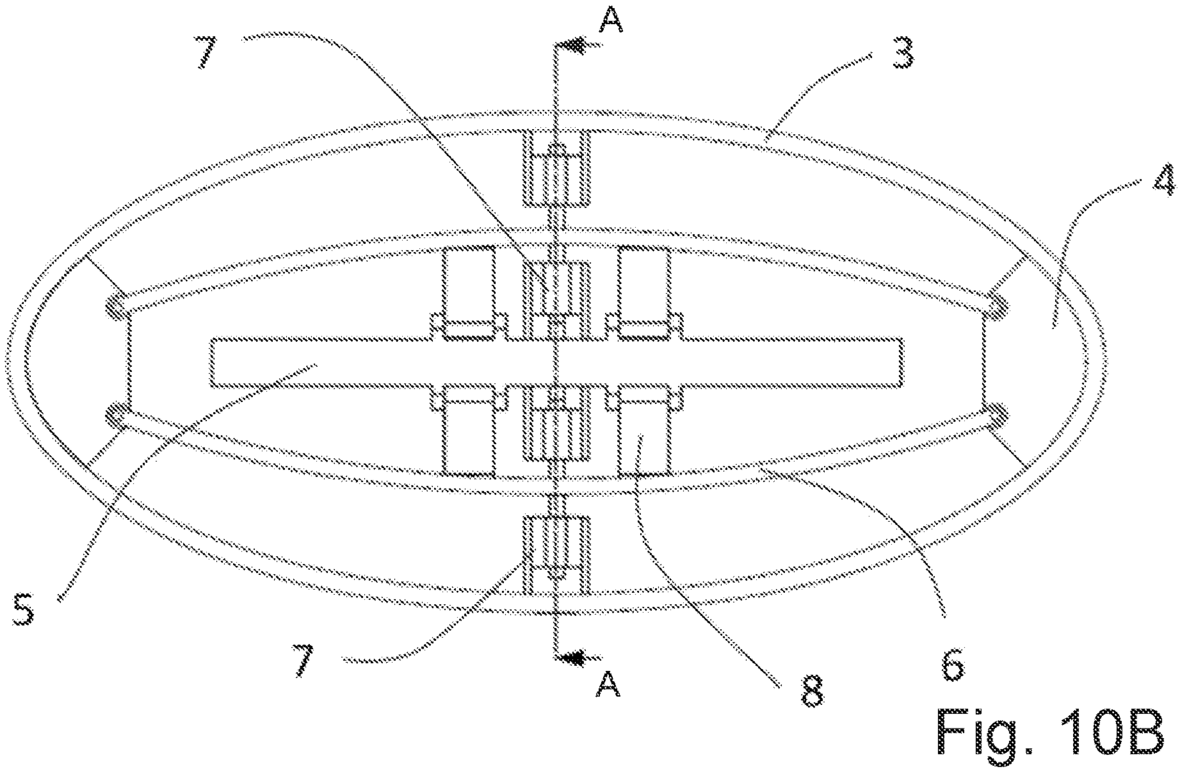

In FIGS. 10A and 10B an embodiment of the invention is shown in which the transmission elements 6 have a slightly arched shape and the linear motors 7 are centrally mounted on the frame 5 and the transmission elements 6 respectively. FIG. 10A shows a cross-sectional view of the embodiment along plane A-A of FIG. 10B. Linear motors 7 can also be centrally mounted on the frame 5 and the sound emitting surfaces 3. The transmission elements may be shaped as flexible plates or rods and can preferably be rotatably fastened to the fastening devices 4. The distance from the central part of the transmission elements 6 to the axis between the fastening devices 4 can be substantially less than the distance from the central part to the fastening devices 4. This way a transmission can be provided in which a large movement of the drive part 8 on the transmission element 6, but with a relatively small force, leads to a small movement of the fastening devices 4, but with a correspondingly larger force.

The transmission can depend on the curvature of the transmission elements 6. If the transmission elements 6 are essentially straight a force doubling can be obtained compared to the movements of the drive. The fastening devices 4 are shown in FIG. 10B as beams, but the fastening of the transmission elements 6 to the sound emitting surfaces may also be done directly to the sound emitting surfaces. The sound emitting surfaces 3 in FIG. 10B can be elliptic. When the fastening devices 4 are pulled inwards by the transmission elements the ellipse can widen, creating a pressure wave in the environment. This way the movements of the linear motor drives will propagate outwards and result in acoustic waves in the water. By varying the eccentricity of the ellipse and the transmission rate in the drive assembly it may be adapted to different situations and frequency contents.

In other embodiments of the sound emitting surfaces other solutions may be chosen. Having linear motors 7 on both the spring elements 6 and the sound emitting surfaces 3 can improve the acoustic output. The linear motors 7 attached to the sound emitting surfaces can be used for the first resonance determined by the sound emitting surfaces 3 interaction with the equivalent water mass. The linear motors 7 acting on the spring elements 6 can be used for the second resonance example, the fastening devices 4 may be fastened directly to pistons, in which a relatively large movement of the drives can provide a small movement of the pistons. Spring elements 8 can be attached to the transmission element 6. This spring element 8 can be a be of any kind, but preferably a spring that will have a frequency dependence. The preferred material in the spring elements 6 and 8 is carbon fiber, glass fiber or spring steel. With the same understanding as in FIG. 6 the spring element 8 will have different resonance modes (FIG. 3). Another frequency can be selected which will improve the broadband performance of the source as explained in FIG. 6.

Figure 11:
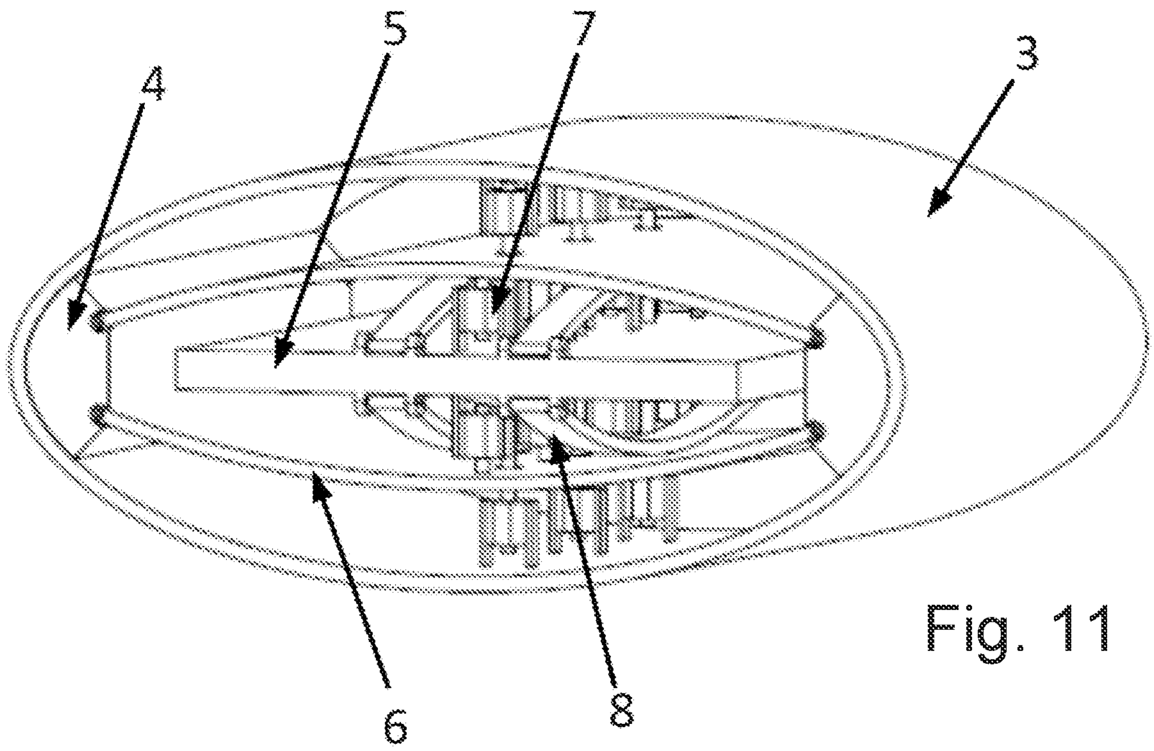
FIG. 11 shows a 3D view of one embodiment of the flextensional source of FIG. 10B.

In FIG. 11 is a 3D view of the source shown in FIG. 10.

Figure 12:
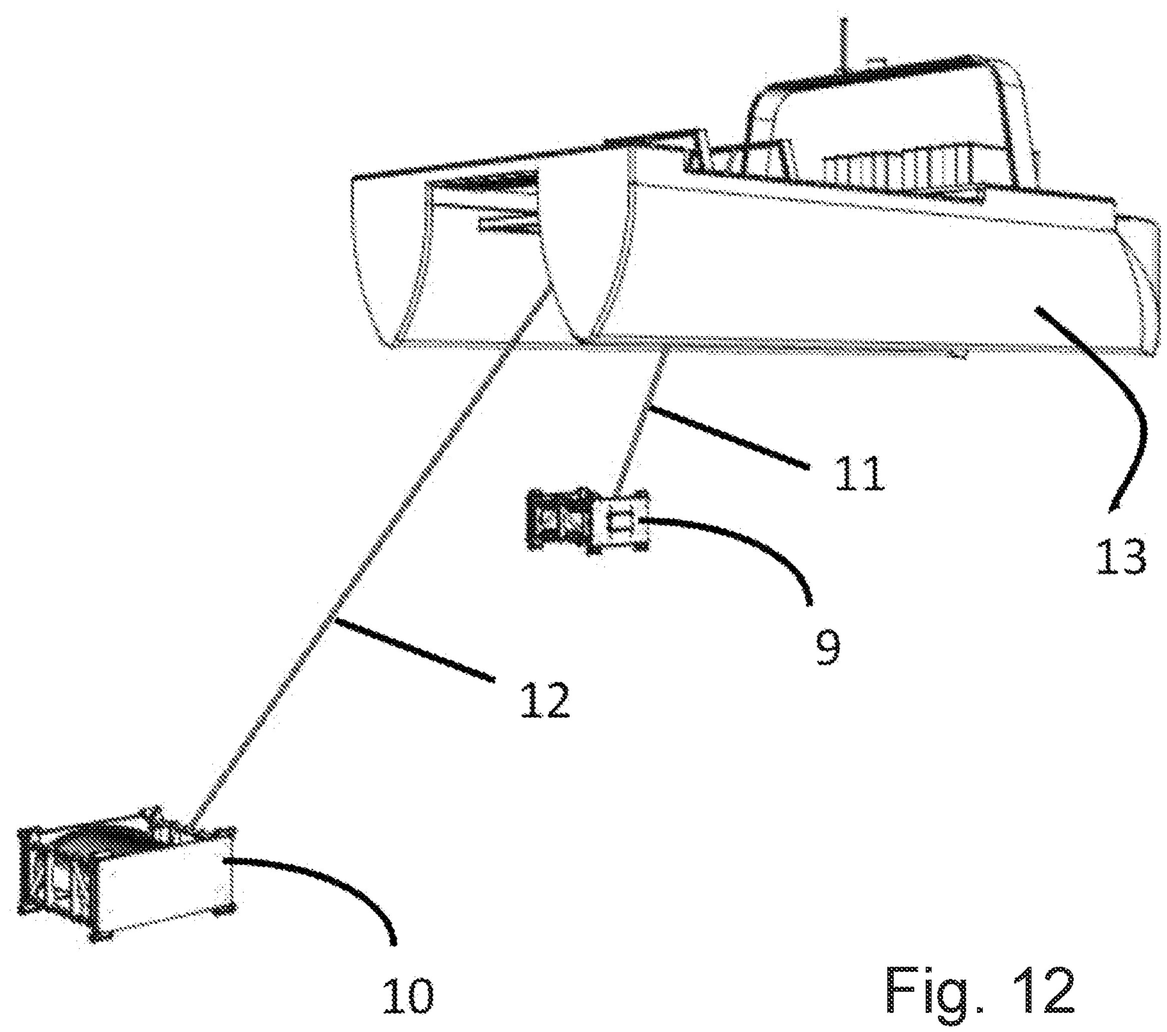
FIG. 12 shows an embodiment of a towing vessel towing two flextensional sources.

FIG. 12 shows a towing vessel 13 towing flextensional sources 9 and 10. The towing vessel 13 can be a catamaran which can be manually operated or autonomous. The sources 9 and 10 can be towed by umbilicals 11 and 12. The seismic sources 9 and 10 can be activated to produce a down-going seismic wave that is at least partially reflected by a subsea interface or boundary. The up-going reflected seismic wave then travels towards sensors in a stream or on the seabed.

Figure 13:
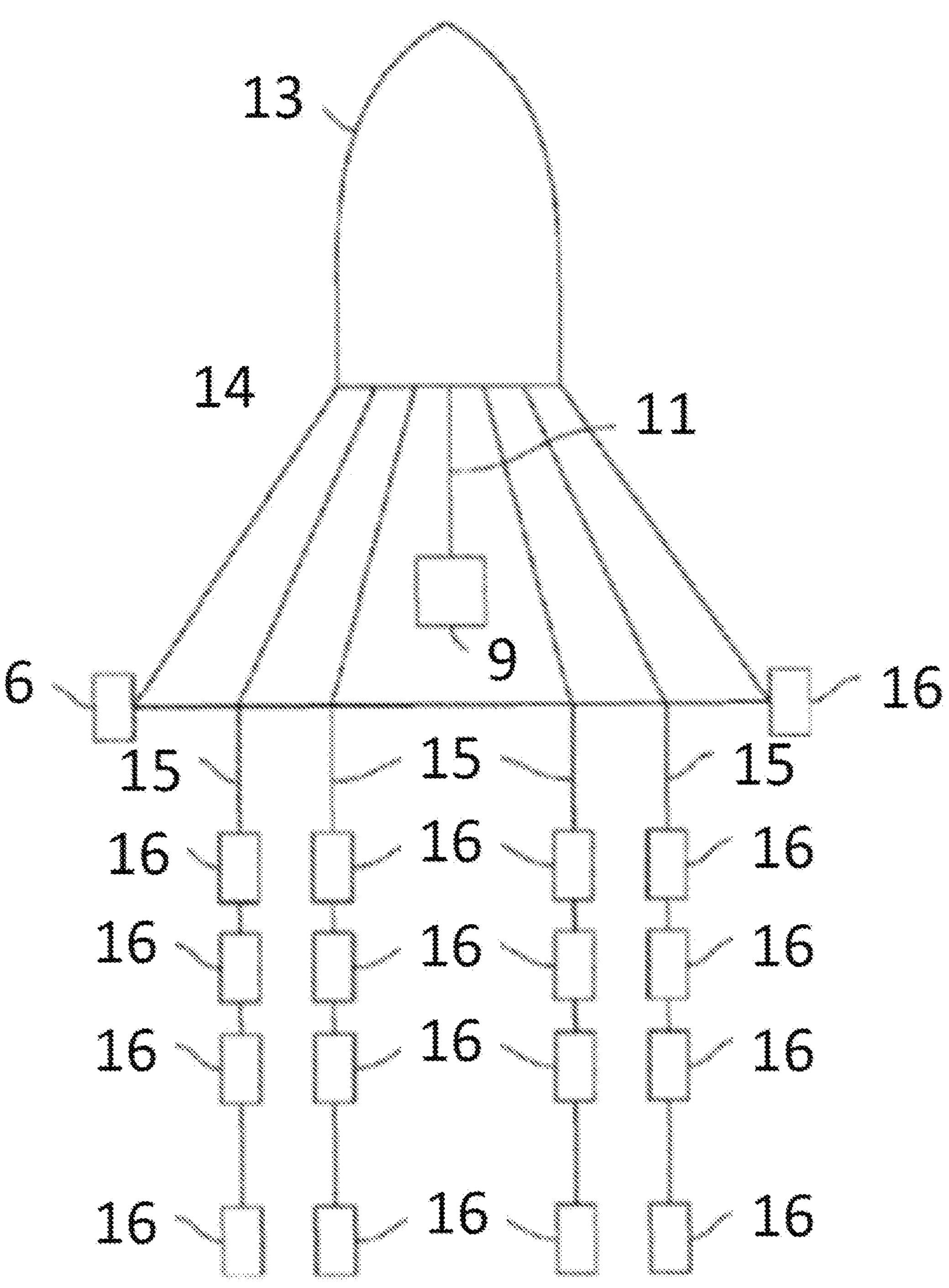
FIG. 13 shows an ocean streamer cable marine seismic acquisition system.

FIG. 13 shows a conventional type of marine seismic surveying with towing vessel 13 towing a seismic source 9 and a plurality of marine streamers 14. A marine cable or streamer 15 incorporating pressure sensing hydrophones 16 is designed for continuous towing through the water. A marine streamer 15 might be made up of a plurality of active or live hydrophone arrays 16 separated by spacer or dead sections. Usually, the streamers are nearly neutrally buoyant and depth controllers or depressors are attached to depress the streamer to the proper towing depth. A tail buoy with a radar reflector is typically attached to the end of the streamer. The entire streamer may be 3-15 Km in length and may be towed by a towing vessel 13.

Systems and methods disclosed and claimed herein can be made and executed without undue experimentation in light of the present disclosure. While the systems and methods of this disclosure have been described in terms of various embodiments, it will be apparent to those of skill in the art that variations may be applied to the systems and methods and in the steps or in the sequence of steps of the methods described herein without departing from the concept, spirit, and scope of the disclosure.

What is claimed is:

1. A drive assembly for acoustic sources, the drive assembly comprising:

at least one vibrating surface capable of being set in vibrational motion;

a frame including at least one linear motor;

two or more flexible transmission elements connecting between fastening devices and extending on both sides of an axis, between the two fastening devices;

at least one spring element connected to the two or more flexible transmission elements, wherein the at least one spring element is configured to introduce a resonance mode different from a resonance mode of the flexible transmission elements;

the at least one linear motor being connected to the transmission elements, and adapted to provide a controlled oscillating motion; and a sound emitting surface connected to the fastening devices.

2. The assembly of claim 1, wherein the at least one linear motor is centrally positioned on the frame.

3. The assembly of claim 1, wherein the at least one linear motor oscillates at a first frequency.

4. The assembly of claim 3, wherein the flexible transmission elements oscillate at a second frequency.

5. The assembly of claim 4, wherein the first and second frequency are between 1 to 300 Hz.

6. The assembly of claim 1, wherein the transmission elements are made of a material selected from the group consisting of carbon fiber, glass fiber, and spring steel.

7. A drive assembly for acoustic sources, the drive assembly comprising:

at least one vibrating surface capable of being set in vibrational motion;

a frame including at least one linear motor;

two or more flexible transmission elements connecting between fastening devices and extending on both sides of an axis, between the two fastening devices;

the at least one linear motor being connected to the transmission elements and adapted to provide a controlled oscillating motion; and a sound emitting surface connected to the fastening devices;

wherein the flexible transmission elements are configured to have a first resonance mode at a first frequency, and wherein the sound emitting surface is configured to have a second resonance mode at a second frequency different from the first frequency, and wherein the first and second resonance modes are selected to provide a combined broadband frequency response for the drive assembly.

8. The driver assembly of claim 7, wherein the transmission elements are made of carbon fiber.

9. The driver assembly of claim 7, wherein the transmission elements are flexible plates or rods.

10. The driver assembly of claim 7, wherein the transmission elements are rotatably fastened to the frame by a fastening device.

* * * * *